United States Patent
Zhao et al.

(10) Patent No.: US 10,940,469 B2
(45) Date of Patent: Mar. 9, 2021

(54) CU CATALYST BASED ON METAL ORGANIC FRAMEWORK, PREPARATION METHOD AND USE THEREOF

(71) Applicant: CHINESE RESEARCH ACADEMY OF ENVIRONMENTAL SCIENCES, Beijing (CN)

(72) Inventors: Xiaoli Zhao, Beijing (CN); Fengchang Wu, Beijing (CN); Yixin Tan, Beijing (CN)

(73) Assignee: CHINESE RESEARCH ACADEMY OF ENVIROMENTAL SCIENCES, Beijing (CN)

(*) Notice: Subject to any disclaimer, the term of this patent is extended or adjusted under 35 U.S.C. 154(b) by 249 days.

(21) Appl. No.: 15/999,839

(22) PCT Filed: Dec. 22, 2016

(86) PCT No.: PCT/CN2016/111427
§ 371 (c)(1),
(2) Date: Aug. 20, 2018

(87) PCT Pub. No.: WO2017/140176
PCT Pub. Date: Aug. 24, 2017

(65) Prior Publication Data
US 2020/0129971 A1    Apr. 30, 2020

(30) Foreign Application Priority Data
Feb. 19, 2016   (CN) .......................... 201610095270.4

(51) Int. Cl.
*B01J 23/72*   (2006.01)
*B01J 31/20*   (2006.01)
(Continued)

(52) U.S. Cl.
CPC ............... *B01J 31/20* (2013.01); *B01J 23/72* (2013.01); *B01J 31/28* (2013.01); *B01J 35/023* (2013.01);
(Continued)

(58) Field of Classification Search
CPC ... B01J 23/72; B01J 31/20; B01J 31/28; B01J 35/023; B01J 35/1019; B01J 35/1042;
(Continued)

(56) References Cited

U.S. PATENT DOCUMENTS

| | | |
|---|---|---|
| 2013/0273461 A1 | 10/2013 | Liu |
| 2016/0038924 A1* | 2/2016 | Bohringer .......... B01D 53/8687 502/171 |
| 2016/0207030 A1* | 7/2016 | Muhammad ............. B01J 23/06 |

FOREIGN PATENT DOCUMENTS

| | | |
|---|---|---|
| CN | 104868109 | 8/2015 |
| CN | 105664944 | 6/2016 |

OTHER PUBLICATIONS

K. Schlichte et al., "Improved synthesis, thermal stability and catalytic properties of the metal-organic framework compound Cu3(BTC)2," Microporous and Mesoporous Materials, vol. 73, Jun. 8, 2004, pp. 81-88.
(Continued)

*Primary Examiner* — Lucas A Stelling
(74) *Attorney, Agent, or Firm* — JCIPRNET

(57) ABSTRACT

A Cu catalyst based on a metal organic framework as well as a preparation method and a use thereof is provided. The Cu catalyst based on a metal organic framework comprises composite particles with catalytic activity sites composed of copper in different oxidization states and a porous carbonized layer with a supporting effect. The method for preparing the catalyst includes the following steps: 1) preparing a metal organic framework Cu-MOF; and 2) carbonizing the
(Continued)

metal organic framework Cu-MOF. The Cu catalyst can be used in aqueous phase catalysis to catalytically decompose organic pollutants in water.

9 Claims, 3 Drawing Sheets

(51) Int. Cl.
| | |
|---|---|
| B01J 31/28 | (2006.01) |
| B01J 35/02 | (2006.01) |
| B01J 35/10 | (2006.01) |
| B01J 37/02 | (2006.01) |
| B01J 37/03 | (2006.01) |
| B01J 37/06 | (2006.01) |
| B01J 37/08 | (2006.01) |
| C02F 1/70 | (2006.01) |
| C02F 101/30 | (2006.01) |
| C02F 101/38 | (2006.01) |

(52) U.S. Cl.
CPC ....... *B01J 35/1019* (2013.01); *B01J 35/1042* (2013.01); *B01J 35/1061* (2013.01); *B01J 37/0236* (2013.01); *B01J 37/031* (2013.01); *B01J 37/06* (2013.01); *B01J 37/08* (2013.01); *C02F 1/70* (2013.01); *B01J 2531/16* (2013.01); *C02F 2101/308* (2013.01); *C02F 2101/38* (2013.01)

(58) Field of Classification Search
CPC .. B01J 35/1061; B01J 37/0236; B01J 37/031; B01J 37/06; B01J 37/08; B01J 2531/16; C02F 1/70; C02F 1/705; C02F 1/725; C02F 2101/30; C02F 2101/308; C02F 2101/322; C02F 2101/345; C02F 2101/38; C02F 2101/40
See application file for complete search history.

(56) References Cited

OTHER PUBLICATIONS

K. C. Leung et al., "Gold and iron oxide hybrid nanocomposite materials," Chemical Society Reviews, vol. 41, Oct. 28, 2011, pp. 1911-1928.

Niu, Hongyun et al., "MOF derived porous carbon supported Cu/Cu2O composite as high performance non-noble catalyst", Microporous and Mesoporous Materials, vol. 219, Jul. 31, 2015, pp. 1-26.

"International Search Report (Form PCT/ISA/210)", dated Mar. 6, 2017, with English translation thereof, pp. 1-6.

* cited by examiner

CU CATALYST BASED ON METAL ORGANIC FRAMEWORK, PREPARATION METHOD AND USE THEREOF

CROSS-REFERENCE TO RELATED APPLICATION

This application is a 371 of international application of PCT application serial no. PCT/CN2016/111427, filed on Dec. 22, 2016, which claims the priority benefit of China application no. 201610095270.4, filed on Feb. 19, 2016. The entirety of each of the above-mentioned patent applications is hereby incorporated by reference herein and made a part of this specification.

BACKGROUND

1. Field of the Invention

The present invention relates to a Cu catalyst based on metal organic framework which is used for catalyzing the decomposition of the organic pollutants in water, and also relates to a preparation method for the Cu catalyst based on metal organic framework.

2. Description of Related Art

Metal organic frameworks (MOFs) are a zeolite material having a repeating network structure formed by self-assembly of organic ligands and metal ions. As a composite material, MOFs have the advantages of porosity, structural order and large specific surface area. They are used in many fields, such as sensing, drug delivery, gas adsorption and Lewis acid catalysis, and therefore, more and more attentions are paid on MOFs. As a widely used metal-organic framework, Cu-MOF has a good performance in catalyzing the "Click" reaction.

K. Schlichte et al. published a paper in 2004 (Improved synthesis, thermal stability and catalytic properties of the metal-organic framework compound $Cu_3(BTC)_2$, Microporous and Mesoporous Materials, 2004, 73, 81-88), in which, a metal organic framework material $Cu_3(BTC)_2$ was prepared and its catalytic performance was studied. In addition, metal organic frameworks Cu-MOF ($Cu(2-pymo)_2$, $Cu(im)_2$ and Cu(BDC) (pymo: 2-hydroxypyrimidine, im: imidazole, BTC: benzene tricarboxylic acid, BDC: benzene dicarboxylic acid) have been reported to catalyze the "Click" reaction.

However, due to the poor stability of metal organic frameworks (MOFs) in water, the breadth and universality of their applications have been limited.

As a catalyst, metal nanoparticles have been widely used due to their advantages of good catalytic selectivity, wide usage, mild reaction conditions and high catalytic efficiency. K. C. Leung et al. published a paper in 2012 (Gold and iron oxide hybrid nanocomposite materials, *Chemical Society reviews*, 2012, 41, 1911-1928), which discussed the research status of composite nanoparticles composed of gold and iron oxides. The paper pointed out that such composite nanomaterials can be used in many fields, such as drug delivery, biosensing, cell sorting and catalytic reactions, and it can be recycled conveniently and quickly when used as a catalyst. However, such materials have poor stability and self-aggregation due to large surface energy, which affects their application efficiency. Many catalytic reactions use noble metals such as Au, Ag, etc. as catalysts, but noble metals are expensive and scarce, so it is necessary to develop non-noble metal materials as catalysts.

In addition, it is of great significance for alleviating water pollution problems to prepare a novel non-noble metal catalyst based on porous metal organic frameworks and use it to catalyze the decomposition of organic pollutants in water environment.

SUMMARY

In order to solve the technical problems that metal organic frameworks cannot be used for aqueous phase catalysis due to poor water stability, and metal nanoparticle catalysts are easy to be agglomerate and unstable. One of the objects of the present invention is to provide a Cu catalyst based on metal organic framework with high catalytic efficiency and simple preparation process.

Another object of the present invention is to provide a method for preparing the catalyst above.

Furthermore, another object of the present invention is to use the above catalyst to catalyze the decomposition of organic pollutants in water.

In order to achieve the above objects, one technical solution of the present invention provides a Cu catalyst based on metal organic framework, which comprises composite particles having catalytic activity sites with copper in different oxidization states, and a porous carbonized layer with a supporting effect.

Preferably, the composite particles contain $Cu_2O$, CuO, and Cu.

Another technical solution of the present invention provides a method for preparing the Cu catalyst, which includes the following steps: 1) preparing a metal organic framework Cu-MOF using a copper source and an organic ligand; 2) carbonizing the metal organic framework Cu-MOF.

Wherein, the steps of 1) preparing a metal organic framework Cu-MOF using copper source and organic ligand are as follows: weighing the copper source and the organic ligand serving as a carbon source by molar ratio and then dissolving them in a solvent; and reacting under a sealed condition at 100-140° C. for 8-24 hours, cooling, filtering, washing with an organic solvent, and then centrifuging to obtain solid precipitation as a lower layer, and vacuum drying;

In step 2), carbonizing the metal organic framework Cu-MOF under nitrogen protection conditions of 200-800° C.

Furthermore, another technical solution of the present invention is to use the Cu catalyst based on a metal organic framework to catalyze the decomposition of organic pollutants in water.

Compared with the prior art, the Cu catalyst based on a metal organic framework and the preparation method thereof provided by the present invention have the following advantages: (1) Low cost. As the main raw material used in the preparation process, the copper source and the organic ligand as carbon source, such as $Cu(NO_3)_2$ and gallic acid, are inexpensive. Compared with traditional noble metals (such as Pt, Au, Ag, etc.) catalysts, the catalyst in the present invention has the same catalytic effect, but the cost can be reduced by dozens of times.

(2) The catalyst is used in a small amount, the catalytic rate is fast, and the catalytic efficiency is high. A small amount of catalyst can catalytically reduce and decompose pollutants within 5 minutes. and the conversion rate is high, which is higher than 99%, so that the catalyst overcomes the disadvantages of time and labor consumptive of the general catalysts.

(3) The catalyst has good water stability, which can be used for aqueous phase catalysis, and can also be regenerated and reused. Most of the existing Cu catalysts cannot be used to catalyze the reaction in water, but the catalyst provided by the present invention can be used for catalyzing the decomposition of pollutants in water. Moreover, the test results show that the catalyst provided by the present invention has no significant change in morphology after repeated use of 5 times, and the decomposition efficiency can still reach 99%.

(4) The preparation process is simple and environmentally friendly. The catalyst preparation process does not require complicated treatment process, and the raw materials do not involve heavy toxic substances. In the catalysis process, no toxic substances are consumed, no other toxic and harmful substances are introduced, which is friendly to the environment.

DESCRIPTION OF THE EMBODIMENTS

Figure 1:
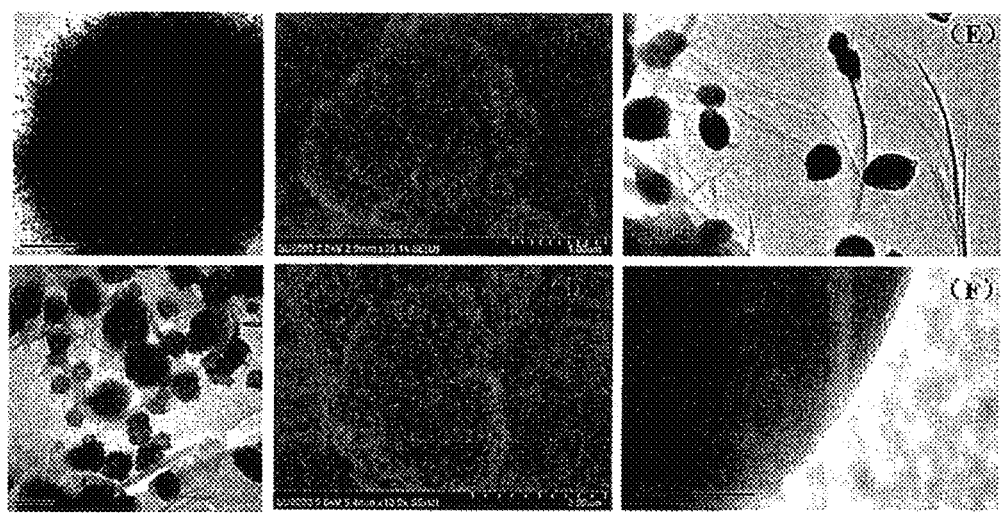
FIG. 1 is the TEM and SEM spectrums of the Cu catalyst prepared in Example 1.

The present invention relates to a Cu catalyst based on metal organic framework, and preparation method and use thereof. The Cu catalyst based on metal organic framework according to the present invention has good water stability and can be used for aqueous phase catalysis.

According to the Cu catalyst of the present invention, the composite particles contain $Cu_2O$, CuO and Cu, preferably, the content of $Cu_2O$ is the highest, followed by CuO and Cu.

The Cu catalyst based on metal organic framework prepared by the present invention has a mesoporous and at least partially crystalline structure.

The suitable compound for the copper source in the preparation method of the present invention is an inorganic compound of copper, such as copper nitrate, copper halide, copper sulfate and copper acetate. Preferably, the copper source is one or more of the solution of $Cu(NO_3)_2$, $CuCl_2$ or $CuSO_4$; more preferably, the copper source is $Cu(NO_3)_2$ solution.

The organic ligand serving as a carbon source is preferably gallic acid and/or tannic acid, more preferably gallic acid.

The solvent used for dissolving the copper source and the organic ligand is one or more of ethanol, methanol, DMF, DMSO and DMAC, preferably DMF.

The organic solvent used for washing is one or more of ethanol, methanol, DMF, $CH_2Cl_2$ and chloroform, preferably DMF and ethanol.

In a preferred embodiment, the Cu catalyst is prepared by the following method:

1) the steps of preparing a metal organic framework Cu-MOF using copper source and organic ligand are as follows: weighing the copper source and the organic ligand serving as a carbon source by molar ratio and then dissolving them in a solvent; and reacting under a sealed condition of 130-140° C., more preferably 130° C. for 12-24 hours, more preferably 24 hours, cooling, filtering, washing the filter residues with organic solvent, and then centrifuging to obtain solid precipitation as a lower layer, and vacuum drying under 40-65° C., more preferably 50° C.; the vacuum drying time is 5-10 hours, more preferably 8 hours;

2) carbonizing the metal organic framework Cu-MOF under nitrogen protection conditions at 200-800° C. The temperature of carbonization is 500-800° C., more preferably 500° C.; the time of carbonization is 2-5 hours, more preferably 4-5 hours.

For the use of Cu catalyst based on metal organic framework of the present invention to catalyze decomposition of organic pollutants in water, preferably, the organic pollutant is one or a combination of phenol, aniline, nitrobenzene, and derivatives thereof and/or an organic dye. More preferably, the derivative of phenol is nitrophenol, chlorophenol, aminophenol or methylphenol; the derivative of aniline is nitroaniline, toluidine or benzidine; the derivative of nitrobenzene is nitrotoluene or chloronitrobenzene; the organic dye is rhodamine B and/or methylene blue. Most preferably, the nitrophenol is 4-nitrophenol or o-nitrophenol; the nitroaniline is p-nitroaniline.

Generally, the Cu catalyst based on metal organic framework has a particle diameter of from 50 nm, preferably from 80 nm up to 120 nm.

Generally, the Cu catalyst advantageously has a specific surface area of 100-180 $m^2$ $g^{-1}$, a pore volume of 0.2-0.75 $cm^3$/g, and a pore size distribution of 2-40 nm. Preferably, it has a specific surface area of 100-154.6 $m^2$ $g^{-1}$, a pore volume of 0.5-0.75 $cm^3$/g, and a pore size distribution of 2-30 nm.

The present invention will be further described in detail below with specific embodiments.

Example 1

A Cu catalyst based on metal organic framework which comprises composite particles with catalytic activity sites composed of copper in different oxidization states, and a porous carbonized layer with a supporting effect.

The steps for preparing the catalyst are as follows: 1) preparing Cu-MOF: weighing 0.9664 g $Cu(NO_3)_2 \cdot 6H_2O$ and 0.7526 g gallic acid and dissolving them in 20 mL DMF respectively, mixing and placing them in a 100 mL PTFE stainless steel reactor, and then reacting under a sealed condition at 130° C. for 24 h, cooling to room temperature after the reaction, filtering, washing the filter residues with DMF and ethanol in turn, and then centrifuging to obtain a lower layer solid precipitation, and carrying out vacuum drying at 50° C.

2) Carbonization: placing the prepared Cu-MOF in a tube furnace, and carbonizing under nitrogen protection conditions at 500° C. for 4 h.

Example 2

A Cu catalyst based on metal organic framework which comprises composite particles with catalytic activity sites composed of copper in different oxidization states, and a porous carbonized layer with a supporting effect.

The steps for preparing the catalyst are as follows: 1) preparing Cu-MOF: weighing 2.601 g $Cu(NO_3)_2 \cdot 6H_2O$ and 0.7526 g gallic acid and dissolving them in 40 mL DMSO respectively, mixing and placing them in a 150 mL PTFE stainless steel reactor, and then reacting under a sealed condition at 150° C. for 12 h, cooling to room temperature after the reaction, filtering, washing the filter residues with dichloromethane and ethanol in turn, and then centrifuging to obtain a lower layer solid precipitation, and carrying out vacuum drying at 50° C. for 5 h.

2) Carbonization: placing the prepared Cu-MOF in the tube furnace, and carbonizing under nitrogen protection conditions at 800° C. for 3 h.

Example 3

A Cu catalyst based on metal organic framework which comprises composite particles with catalytic activity sites composed of copper in different oxidation states, and a porous carbonized layer with a supporting effect.

The steps for preparing the catalyst are as follows: 1) preparing Cu-MOF: weighing 0.9664 g $Cu(NO_3)_2 \cdot 6H_2O$ and 2.7815 g tannic acid and dissolving them in 80 mL ethanol respectively, mixing and placing them in a 250 mL PTFE stainless steel reactor, and then reacting under a sealed condition at 105° C. for 24 h, cooling to room temperature after the reaction, filtering, washing the filter residues with DMF and ethanol in turn, and then centrifuging to obtain a lower layer solid precipitation, and carrying out vacuum drying at 65° C. for 8 h.

2) Carbonization: placing the prepared Cu-MOF in the tube furnace, and carbonizing under nitrogen protection conditions at 220° C. for 4 h.

Structure Characterization

The catalysts prepared in Examples 1-3 were structurally characterized as follows:

1. Using an electron beam transmission electron microscope (TEM) (JEOL JEM-200CX) with an acceleration voltage of 160 kV, and a field emission scanning electron microscopy (SEM) (Hitachi S-5500) to analyze the particle size and morphology of the catalysts. The results show that the prepared catalyst comprising composite particles, with catalytic activity sites composed of copper in different oxidation states, supported on the carbonized layer have uniform particle size of 80-120 nm. The specific results are shown in Table 1.

TABLE 1

Specific surface and pore size distribution results of the catalysts prepared in Examples 1-3

| | particle size (nm) | specific surface area ($m^2g^{-1}$) | Pore volume ($cm^3/g$) | Pore size distribution (nm) |
|---|---|---|---|---|
| Example 1 | 100 | 154.6 | 0.75 | 2-22 |
| Example 2 | 80 | 120.0 | 0.62 | 10-30 |
| Example 3 | 120 | 100 | 0.5 | 5-28 |

Figure 2:
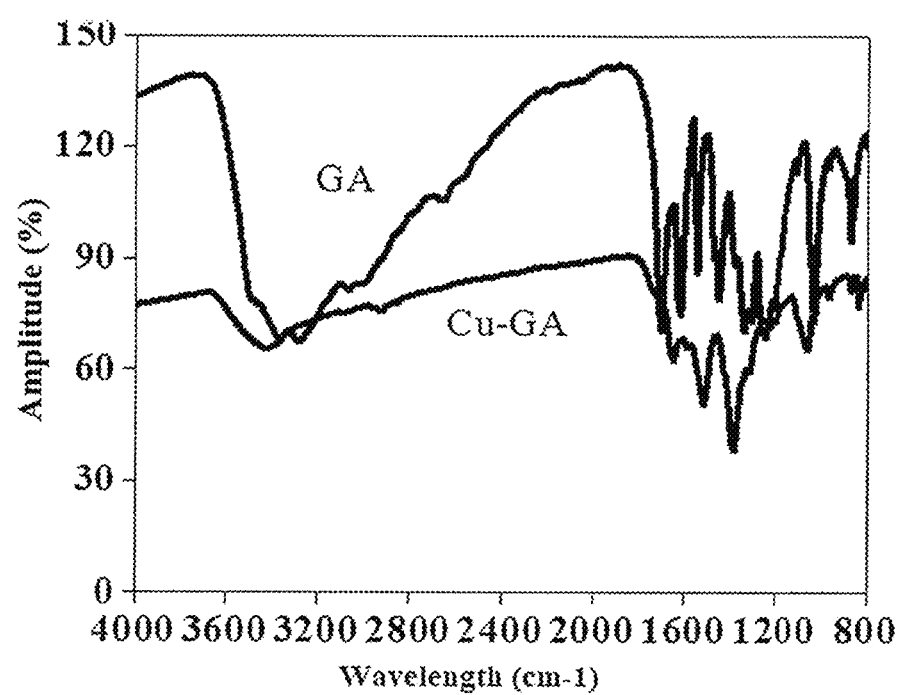
FIG. 2 is the infrared contrast spectrum of the Cu catalyst Cu-GA prepared in Example 1 and gallic acid GA.

2. Characterizing the Cu catalysts prepared in Examples 1-3 by Fourier transform infrared spectroscopy (FTIR) (Nicolet 170 SX), using KBr tableting method, and the comparative diagram of Example 1 is shown in FIG. 2.

Comparing the infrared spectrum of gallic acid used in Examples 1 and 2 with the obtained copper catalyst, the peak width of the O—H of the gallic acid molecule at 3329 $cm^{-1}$ narrows down, which indicates that stretching vibration has occurred. The COO— of the gallic acid molecule has a stretching vibration at 1600 $cm^{-1}$ and 1366 $cm^1$. When gallic acid reacting with Cu, O—H exhibits a stretching vibration at 3429 $cm^{-1}$, and a vibration peak of Cu—O appears at 493 $cm^{-1}$, and the O—H peak in the carboxylic acid at 1029 $cm^{-1}$ disappears. It is indicated that all carboxyl and hydroxyl groups in gallic acid have reacted. In Cu-GA, C=O has a bending vibration at lower frequencies, COO— in carboxyl exhibits characteristic peaks at 1300 $cm^{-1}$ and 1600 $cm^{-1}$, and asymmetric stretching at 1500 $cm^{-1}$ and 1426 $cm^{-1}$. All above indicate that all of the carboxyl and phenolic hydroxyl groups have reacted with Cu.

Comparing the infrared spectrum of the Cu catalyst prepared in Example 3 with tannic acid, the peak width of the O—H of tannic acid molecule at 3200-3420 $cm^{-1}$ narrows down, and a vibration peak of Cu—O appears at 493 $cm^{-1}$, which indicate that the phenolic hydroxyl has reacted with Cu.

3. XRD and XPS tests

Using the X-ray diffraction (XRD) (b/max-RB Diffractometer) to obtain the XRD spectrum of catalysts prepared in Examples 1-3 by Cu Kα rays filtered with nickel, in which scanning ranged is from 5° to 90°, scanning interval is 0.02°.

Analyzing the XPS curve of the obtained Cu catalyst by X-ray photoelectron (using Al Kα ray as a light source of XPS).

Figure 3:
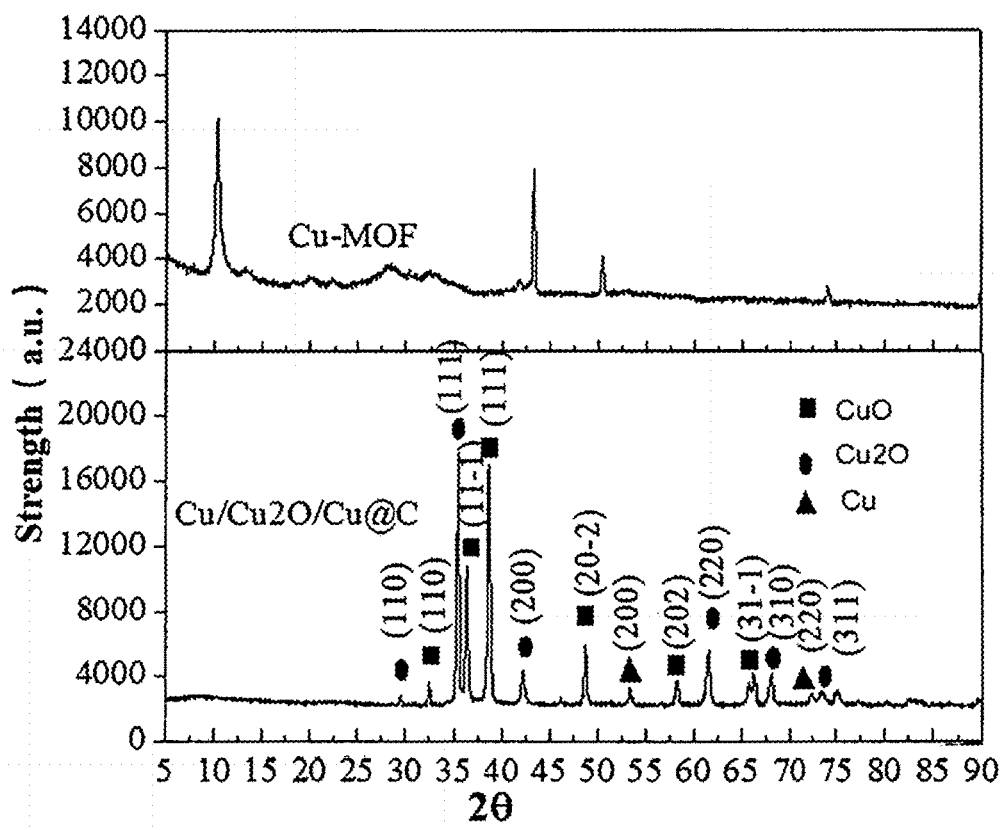
FIG. 3 is the XRD spectrum of the Cu catalyst prepared in Example 1.

The test results show that the XRD spectra of the Cu catalysts prepared in Examples 1-3 of the present invention all have characteristic peaks of $Cu_2O$ at 2θ=29.5°, 34.5°, 42.2°, 61.5°, 67.9°, 73.4°, which comprise of (110), (111), (200), (220), (310) and (311); have characteristic peaks of Cu—O at 10.26°, 41.79°, 43.27° and 50.39°; and have characteristic peaks of Cu at 32.5° (110), 36.4° (111), 38.6° (200), 48.7° (20-2), 53.4° (020), 58.2° (202), 66.1° (31-1), 51.3° (200) and 72.3° (220). The strong and sharp peaks represent the high crystallinity of the material. The content of various forms of copper can be judged from the size and number of peaks of various forms of Cu. The results show that the content of $Cu_2O$ is the highest, followed by CuO and Cu. The XRD spectrum of the Cu catalyst prepared in Example 1 is shown in FIG. 3.

Figure 4:
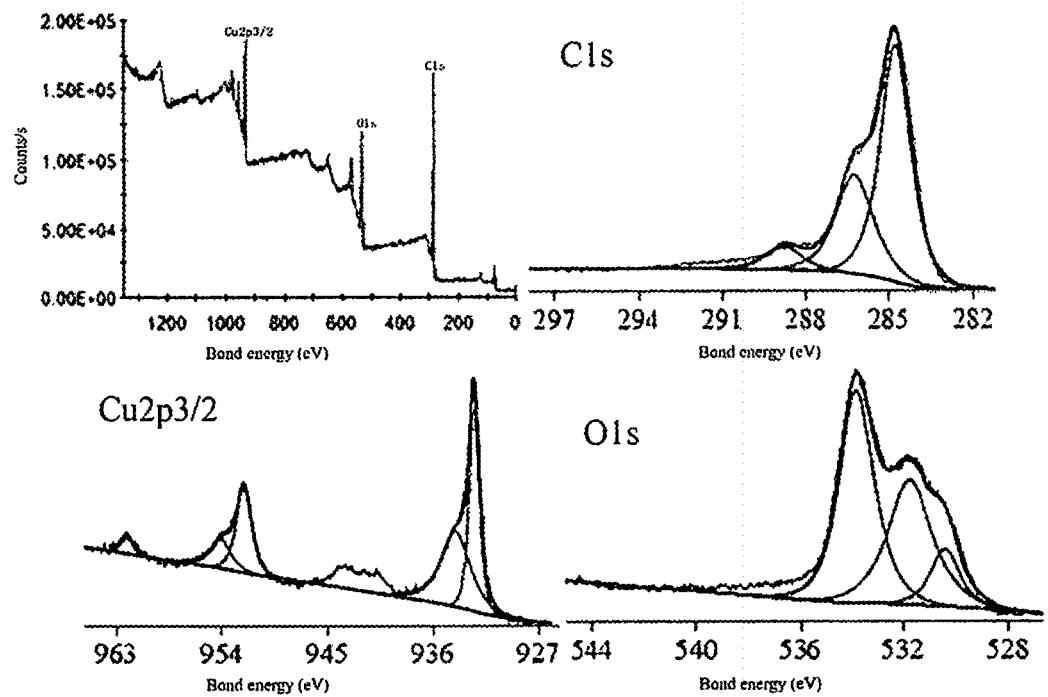
FIG. 4 is the XPS spectrum of the Cu catalyst prepared in Example 1.
Figure 5:
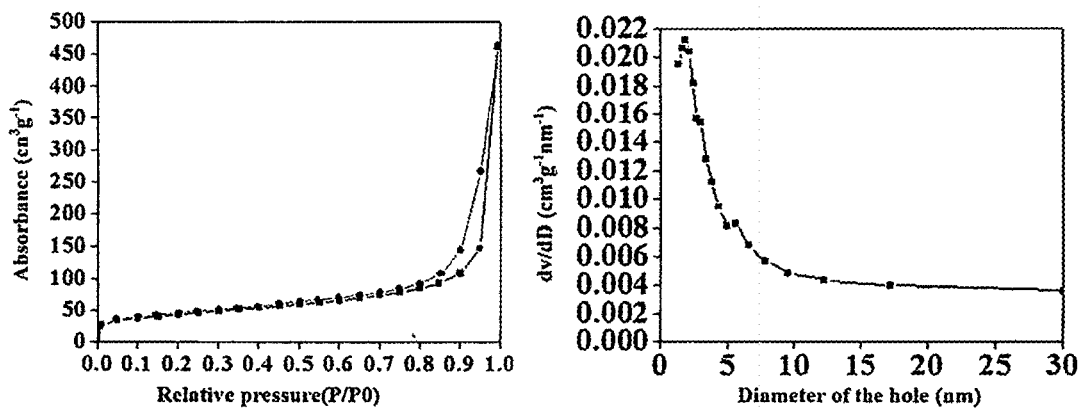
FIG. 5 is the result of $N_2$ adsorption-desorption of the Cu catalyst prepared in Example 1.

The XPS spectra of the Cu, O and C elements of the prepared Cu catalyst further confirmed the existence of Cu, $Cu_2O$ and CuO. The XPS spectrum of the Cu catalyst prepared in Example 1 is shown in FIG. 4.

Cu2p3/2 has characteristic peaks at 932.1 and 933.8 eV, and the peak at 932.1 eV is $Cu_2O$/Cu ($Cu^+$/$Cu^0$). Since the peak positions of $Cu^+$ and $Cu^0$ are very close, it is difficult to distinguish them specifically, which is similar to other literature reports. The characteristic peak of CuO appears at 933.8 eV, which is consistent with other literatures, which record that the CuO characteristic peak appears at 933.4-933.9 eV. The spectrum of O1s is also shown in the figure. The characteristic peaks of O1s appear at 530.2, 531.6, 533.6 eV, and the characteristic peaks of O1s in $Cu_2O$ appear at 930.2 eV, which is consistent with the reports in the literature in the range of 530.0-530.7 eV. The characteristic peak of O1s in CuO appears at 533.6 eV, and the peak appears at 531.6 eV is oxygen of OH and $H_2O$ as well as carboxylic acid adsorbed on the surface of the material.

4. Raman Spectrum

Using the Raman spectroscopy (RM2000, Renishaw, UK) to obtain the Raman spectrum of the Cu catalyst prepared in Example 1-3. Setting the excitation wavelength at 514 or 515 nm, which is generated by excitation of an $Ar^+$ laser. The result shows that, there are two peaks in the Raman spectrum, one peak appears at 1588 $cm^{-1}$, which is called G peak, corresponding to the graphite structure peaks; and another peak appears at 1375 $cm^{-1}$, which is called D peak, corresponding to the defected peaks. The two peaks are characteristic peaks of the graphitized carbon material, which indicates that the prepared material is successfully graphitized.

Example 4

Catalytic performance test of the Cu catalyst provided by the present invention

This experiment uses the Cu catalyst prepared in Example 1 to catalyze reduction of 4-nitrophenol (4-NP).

In order to eliminate the interference of adsorption, we add the catalytic material directly without the reducing agent $NaBH_4$. We find the concentration of 4-NP changed little by testing it after 24 h, indicating that the adsorption effect of the particles is not obvious, which proves that the removal of 4-NP is caused by the catalytic reduction of the particles.

The catalytic experiment is carried out in a colorimetric ware directly, by adding 2 mL of deionized water, 1 mL of 0.2 M $NaBH_4$, 0.1 mL of 5 mM 4-NP and 50 μL (2 mg/mL) of the catalyst solution. Adding $NaBH_4$ solution before adding the catalyst, and the solution turns yellow quickly. With the addition of the catalyst, the yellow gradually fades out, and turns colorless within 3 min, indicating that 4-NP has been reduced and decomposed. It is obvious from the catalytic effect that the complete catalytic reduction of 4-NP requires 160 s, which is faster than that of generally reported materials.

After the reaction, centrifuging, and taking the obtained catalyst to the next catalytic experiment. After 5 times of reuse, the catalytic efficiency of the material can still reach 99%. The morphology of the catalyst does not change in visual inspection.

In addition, we also test the catalytic performance of the catalyst for other pollutants such as O—NP, methylene blue, rhodamine B, nitroaniline under the same conditions. The result shows that the catalyst prepared by the present invention has a good catalytic effect on the decomposition of the above pollutants. For nitrobenzene substances, no matter where the substituents are located, they have good catalytic effects, and the conversion rate of catalytic reduction is over 99%. However, the catalytic effect on nitrotoluene and nitrochlorobenzene is slightly worse than that of nitroaniline and nitrophenol. The possible reason is that the decomposition mechanism and the processes of nitrotoluene and nitrochlorobenzene are more complicated than that of nitroaniline and nitrophenol.

The above examples are only used for illustrative purposes, and the scope of the invention is not limited thereto. Modifications will be obvious to those skilled in the art, and the invention is only limited by the scope of the appended claims.

What is claimed is:

1. A method of preparing a Cu catalyst based on metal organic framework, wherein the Cu catalyst comprises composite particles having catalytic activity sites containing copper in different oxidization states and a porous carbonized layer for supporting the composite particles, wherein the method comprises:
    (a) preparing a metal organic framework of copper (Cu-MOF) using a copper source and an organic ligand; and
    (b) carbonizing the Cu-MOF,
    wherein the composite particles comprise $Cu_2O$, $CuO$, and $Cu$, and the content of $Cu_2O$ is the highest;
    wherein the Cu catalyst has an overall particle diameter of 80-120 nm, a specific surface area of 100-154.6 $m^2/g$, a pore volume of 0.5-0.75 $cm^3/g$, and a pore size distribution of 2-30 nm;
    wherein the copper source comprises a solution of $Cu(NO_3)_2$, $CuCl_2$, $CuSO_4$, copper acetate or a combination thereof, and the organic ligand comprises gallic acid, tannic acid or a combination thereof.

2. The method of claim 1, wherein a molar ratio of the copper source and the organic ligand is 1:0.5 to 1:2.

3. The method of claim 1, wherein
    the step (a) comprises:
        dissolving the copper source and the organic ligand in a solvent;
        performing reaction under a sealed condition at 100-140° C. for 8-24 hours;
        cooling, filtering, washing a filter residue, and then centrifuging to obtain a solid precipitation; and
        drying the solid precipitation to obtain the Cu-MOF; and
    the step (b) is performed under nitrogen at 200-800° C.

4. The method of claim 3, wherein the solvent used for dissolving the copper source and the organic ligand is one or more of ethanol, methanol, DMF, DMSO and DMAC.

5. The method of claim 3, wherein the reaction is performed for 12-24 hours.

6. The method of claim 3, wherein the reaction is performed at a temperature of 130-140° C.

7. The method of claim 3, wherein the washing step uses an organic solvent of ethanol, methanol, DMF, $CH_2Cl_2$, chloroform, or any combinations thereof.

8. The method of claim 3, wherein the drying step is performed under vacuum at a temperature of 40-65° C. for 5-10 hours.

9. The method of claim 3, wherein the step (b) is performed at 500-800° C. for 4-5 hours.

* * * * *